(12) United States Patent
Dunn et al.

(10) Patent No.: US 6,314,560 B1
(45) Date of Patent: Nov. 6, 2001

(54) METHOD AND APPARATUS FOR A TRANSLATION SYSTEM THAT AGGRESSIVELY OPTIMIZES AND PRESERVES FULL SYNCHRONOUS EXCEPTION STATE

(75) Inventors: David A. Dunn, San Jose; William B. Buzbee, Half Moon Bay, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/616,467

(22) Filed: Jul. 14, 2000

Related U.S. Application Data

(62) Division of application No. 09/109,467, filed on Jul. 2, 1998.

(51) Int. Cl.$^7$ .................................................. G06F 9/45
(52) U.S. Cl. .................... 717/5; 717/7; 712/216
(58) Field of Search ............ 717/5, 7; 712/23, 712/216, 228

(56) References Cited

U.S. PATENT DOCUMENTS

| | | | |
|---|---|---|---|
| 5,428,807 | * | 6/1995 | McKeen et al. ............ 712/216 |
| 5,551,015 | * | 8/1996 | Goettelmann et al. ........ 717/5 |
| 6,031,992 | * | 2/2000 | Cmelik et al. ............... 717/5 |

* cited by examiner

Primary Examiner—Kakali Chaki
Assistant Examiner—Hoang-Vu Antony Nguyen-Ba

(57) ABSTRACT

A translating software emulator designed for converting code from a legacy system to a target system and fully preserving the synchronous exception state while still allowing for full and aggressive optimization in the translation. A user application is translated to a target system using full optimization techniques. The translation may be done dynamically by an emulator emulating the legacy system on the target system, or the translation may be a static translation or a compilation, fully generating a new executable program operable on the target system. The invention recovers from the exception properly by restoring the target machine state to the machine state expected by the legacy system. This recovery is done by using an exception delivery mechanism to restore the machine state of the target system before executing the exception handling code. The restoration of the machine state is done by executing a recovery block generated by the translation that modifies the machine state to match the legacy machine state.

16 Claims, 4 Drawing Sheets

US 6,314,560 B1

METHOD AND APPARATUS FOR A TRANSLATION SYSTEM THAT AGGRESSIVELY OPTIMIZES AND PRESERVES FULL SYNCHRONOUS EXCEPTION STATE

CROSS REFERENCE TO RELATED APPLICATION(S)

This is a divisional of copending application Ser. No. 09/109,467 filed on Jul. 2, 1998.

FIELD OF THE INVENTION

The present invention lies in the field of software emulation and, more specifically, is directed to faithfully handling exceptions in the context of emulating a user application.

BACKGROUND OF THE INVENTION

Software emulation systems use a combination of instruction interpretation and instruction translation to run a program originally written for an old machine architecture on a new architecture. This technology can also be used to emulate a program for one architecture on the same architecture for the purposes of profiling that program, or on one architecture for emulating another implementation of that architecture, e.g. a different micro-architecture.

An instruction emulator maintains an emulated state that models the state of the legacy architecture. During emulation, the emulator modifies the emulated machine state in the same way that the machine state would have been modified had the program executed on the legacy architecture.

"Instruction interpretation" examines the effects of each instruction in the legacy program—one instruction at a time—and reproduces that instruction's affects on the emulated state stored on the new platform. "Instruction translation" refers to a more sophisticated process in which multiple instructions, i.e. blocks of code, are translated into a functionally equivalent new block of code executable on the new platform. The new block of code executes more efficiently than would result from simple instruction interpretation. The main benefit is removing the software fetch/decode logic involved with software interpretation. This process of translation may include optimizations that re-order the instructions in the translated code. However, this reordering must not change the behavior of the emulated program. Frequently a combination of both instruction interpretation and instruction translation is employed to emulate a given user application successfully.

In addition to emulating the semantics of the old instruction set, the emulator must deliver exceptions to the emulated process in a manner consistent with the old system. "Exceptions" can be briefly defined as unexpected or unusual conditions that arise during execution. An exception generally arises in the hardware and is communicated to the operating system ("OS"). The OS in some cases "delivers" the exception to the user application. Exceptions can be classified as either synchronous or asynchronous. Synchronous exceptions arise as a direct result of executing an instruction. Examples are arithmetic conditions like overflow or divide by 0, privilege or "permission" faults, etc. In general, the instruction has done something or attempts to do something illegal or exceeding available resources. Asynchronous exceptions are those caused by something external to the program. Examples are timer interrupts, communications with other programs (messages), etc. These can arise at any time and thus are "asynchronous" to the executing program. Since this invention deals with the recovery from synchronous exceptions, any further reference to an exception will mean a synchronous exception.

Typically, when an operating system ("OS") generates an exception notice to an application, the OS places a "context structure" on the application's stack. The context structure contains a snapshot of the machine state, plus information about interrupted system calls, if any. The machine state is restored according to the context structure when the exception handler returns. The exception handler may also modify the machine state contained in the context structure, and any such modifications are propagated to the real machine state by the OS.

One challenge involved in emulation of code designed for one architecture (the legacy platform) on the machine of a different architecture (the target platform) occurs in systems that support the handling of synchronous exceptions. When the conditions that would cause a synchronous exception in the original code occur, the translation system must ensure that the modeled state (the target machine state) is consistent with the "legacy machine state". For the purposes of this application, we define the "legacy machine state" as the machine state that would exist at the relevant time on the legacy platform had the original code executed on the legacy platform. This consistency is difficult to maintain in an aggressively optimizing translator. Optimization can re-arrange the order of execution of code and when an exception occurs, the target machine state does not match the legacy machine state, the state expected by the old program.

Traditional translators deal with this problem in one of three ways. One method is to ignore the problem and simply disallow examination of local variables in exception handlers. A second method is to use barrier logic to prevent optimization at synchronous exception points. This method severely restricts the ability to optimize a translation because it limits the ability to re-order the sequence of instructions.

A third known method allows for limited reordering in optimization by using a scheme of renaming registers. This method allows for reordering of instructions to "assign early", that is, optimizing by using a register to store a value that was to be assigned to a memory location later. The state of the machine can be restored if an exception occurs in a load instruction by filling in the proper memory locations using the values temporarily stored in the renamed registers. Since any load instruction may potentially cause an exception, however, this method does not allow for re-orderings that "assign late". Assignment instructions can not be moved after a load instruction if the proper legacy machine state is to be preserved. This limitation does not allow for full and aggressive optimization in a software translation.

Therefore, there is a need for a system and method to translate existing software to a new architecture that fully preserves the synchronous exception state while still allowing for full and aggressive optimization in the translation.

SUMMARY OF THE INVENTION

The present invention provides a system and a method to transfer software to a new architecture with full and aggressive optimization while still providing full preservation of the legacy machine state for handling exceptions. According to one aspect of the invention, when an exception is detected during execution on the target (new) platform, the machine state is modified to a state anticipated by the original code. This "legacy machine state" is presented to the exception handling routine, as further explained below.

In one embodiment of the invention, the transfer of software to a new architecture is done with the use of a translator. This embodiment starts with a user application designed for execution on a legacy platform. The translator can be an emulator, dynamically translating the user application to instructions that operate on the target computer as the operation of the user application dictates. The translator can also be a static translator or a compiler, fully creating a new executable program that executes later on the target platform.

An effective translator optimizes the instructions it creates to most efficiently utilize the architecture of the target platform. In optimizing, the translator may potentially re-order the equivalent instructions of the user application when creating the target code. When the translator recognizes that it has created a new instruction that has potential to cause a synchronous exception, it creates a recovery block. The recovery block contains instructions that complete all functions necessary to restore the target machine state to the legacy machine state. The translator may create several recovery blocks, one for each instruction of translated code that has the potential to cause a synchronous exception. For dynamically translated code, it may wait to create the recovery block after a synchronous exception is detected.

The translated target code is then executed on the target platform. According to the present invention, the operating system on the target platform detects an exception, and the target operating system collects the machine state from the hardware and calls a runtime recovery procedure. The runtime recovery procedure is responsible for invoking the application's exception handling routine while presenting a machine state that is consistent with the legacy machine state. Based upon this machine state, the runtime recovery procedure locates the recovery block associated with the exception detected. For dynamically translated code the recovery block may not yet exist and will need to be generated by the translator.

The runtime recovery procedure first causes control of the program to resume in the located recovery block. The recovery block executes, restoring the machine state to be consistent with the legacy machine state. The runtime recovery procedure then invokes the application's exception handler which now functions correctly. The user has full access to the legacy state in handling the exception.

In another embodiment of the invention, the translation is a compilation. Instead of a user application operating on an emulator, source code is being compiled. Compilation is a form of translation. The compilation behaves much like a static translation of a user application, except that the source code is not operable on a legacy platform. Effective compilers optimize instructions when creating machine code from source code. When a compiler, according to this invention, generates an instruction with the potential to cause a synchronous exception, it creates a corresponding recovery block. The recovery block contains code that, when executed, results in a target machine state equivalent to the legacy machine state. In this embodiment of the invention, the legacy machine state is the machine state that could have resulted had the target platform executed target code not optimized by the compiler. Restoration of the machine state allows for graceful recovery from a synchronous exception and full debugging capability at the point of the exception.

The foregoing and other objects, features and advantages of the invention will become more readily apparent from the following detailed description of a preferred embodiment of the invention which proceeds with reference to the accompanying drawings.

DETAILED DESCRIPTION

Figure 1:
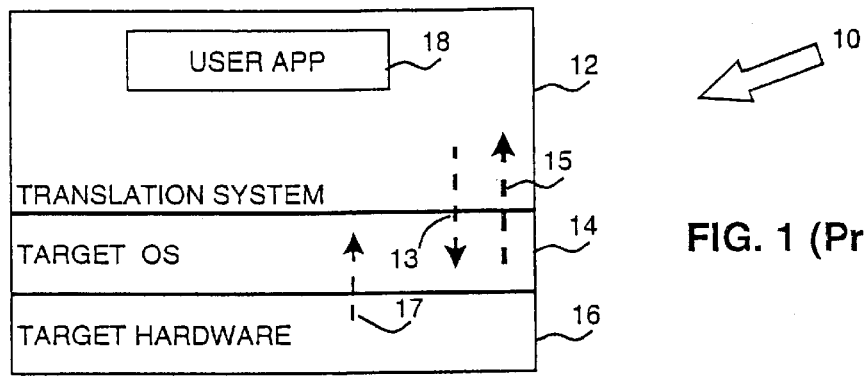
FIG. 1 is a simplified block diagram of a known digital computer system that translates a user application operable on a legacy machine to code operable on a target computer system.

FIG. 1 is a simplified block diagram of a known digital computer system that translates a user application 18 operable on a legacy machine to code operable on a target computer system 10. In FIG. 1, the target computer system 10 includes a hardware platform 16, which can comprise any digital computer architecture such as a CISC, RISC, VLIW or EPIC processor architecture. The primary purpose of such a system is to support emulation, executing on a target platform, of a user application program 18 which was previously constructed to execute on a different hardware and/or operating system, which we call the legacy platform. The target platform will be defined as the target hardware 16 and target operating system 14. It is useful in some cases for the target platform and the legacy platform to be the same platform. An operating system 14 interfaces with the hardware platform 16 and provides the usual operating system functions for managing and utilizing hardware resources such as the processor, memory, and peripheral devices. A translation system 12 is stored in memory in the system 10 for execution in cooperation with the operating system 14 in the usual fashion. The translation system 12 provides for translation of the user application program to produce software instructions operable on the target platform. The primary purpose of the translation system will be as an emulation system, though it could also be as a static translation system or a compilation system, each described further below. Dashed line 13 represents operating system calls initiated by the translation system 12, while dashed line 15 represents messages or signals initiated by the operating system, including notification of exceptions that arise during execution. Dashed line 17 indicates hardware notification of exceptions to the operating system.

Figure 2:
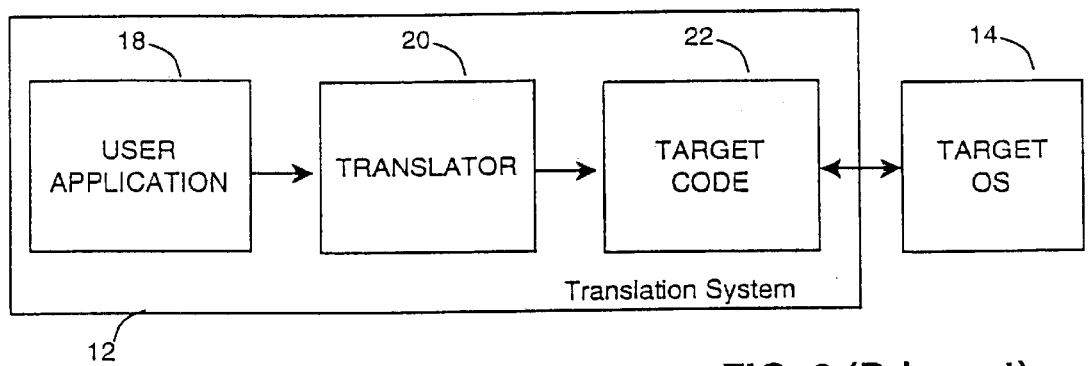
FIG. 2 is a simplified block diagram of the known translation system of FIG. 1 in greater detail.

FIG. 2 is a simplified block diagram of the known translation system of FIG. 1 in greater detail. The translation system 12 includes a translator 20 that converts a user application program 18 written to operate on a legacy system into target code 22 operable on the target platform.

The primary purpose for a translator 20, is as an emulator, although it could be any translating program such as a static translator or a compiler. An emulator translates the user application software dynamically into target code 22 to allow for execution of the user application on the target operating system 14 and hardware. A static translator translates the entire user application into target code 22, which is a new executable application operable on the target platform. A compiler translates source code written in a high order software language, such as C or pascal, into target code 22, which is an executable application operable on the target platform.

Figure 3:
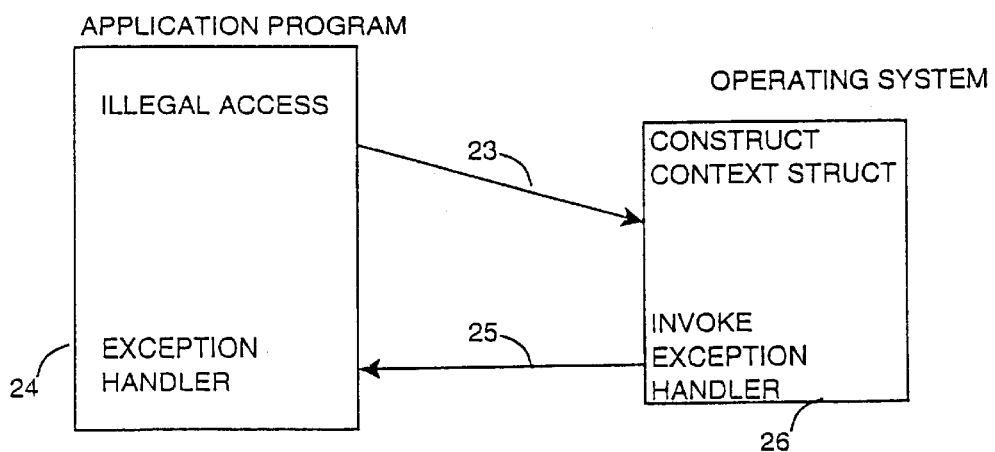
FIG. 3 is a flow diagram of a traditional software exception delivery mechanism.

FIG. 3 is a flow diagram of a traditional software exception delivery mechanism. Programming languages and environments, such as C on Unix, provide a mechanism for an application program 24 to examine the machine state when any type of synchronous exception occurs. An example of a synchronous exception is the application program 24 executing an instruction, indicated by the line 23, where the instruction references an invalid memory location. When the exception occurs, several steps occur.

First, the hardware detects the exception. The hardware records certain information about the register state of the processor into shadow registers and passes control to the operating system 26. Next, the operating system 26 creates a "context structure" that records the machine state saved by the hardware when the exception occurs. Lastly, the operating system 26 invokes a procedure, indicated by line 25, in the application program 24 which was previously designated as the exception handling routine. The operating system 26 also passes a copy of the context structure to the application program 24 for use by the exception handling routine.

Figure 4:
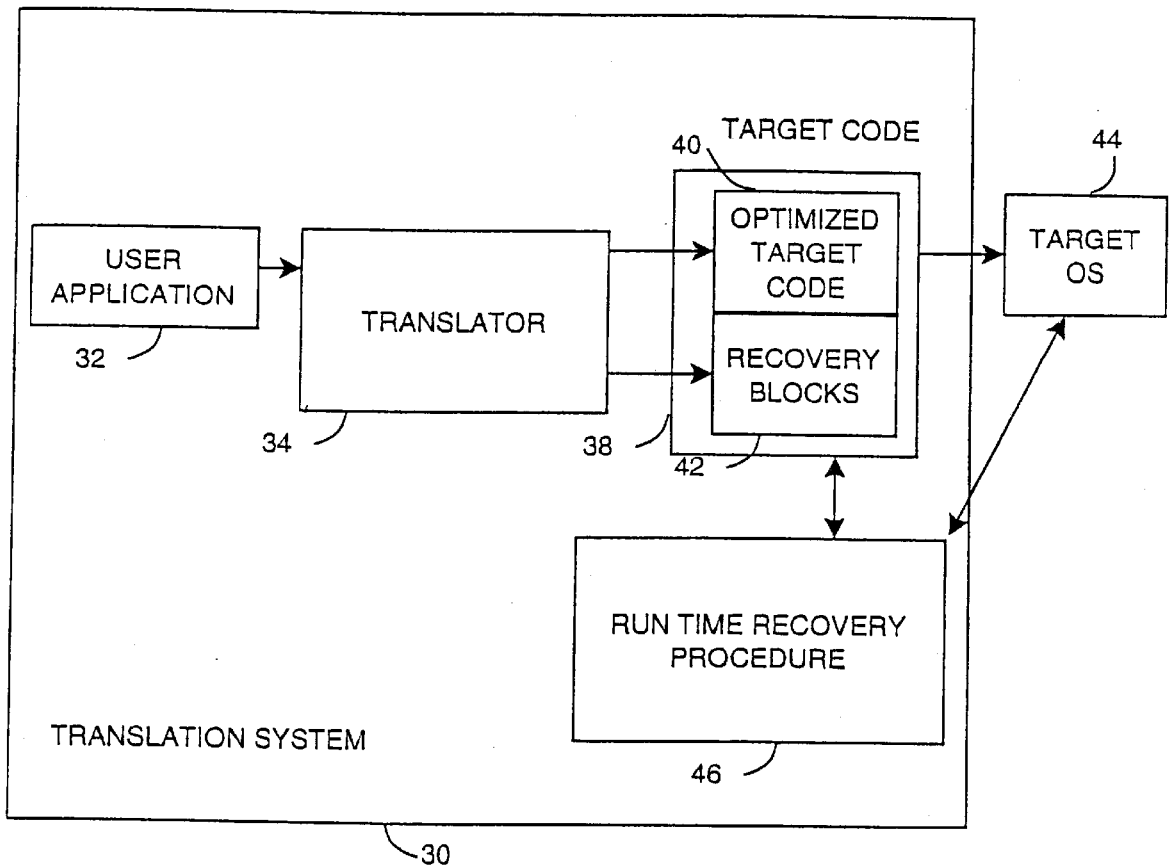
FIG. 4 is a simplified block diagram of a translation system according to the present invention.

FIG. 4 is a simplified block diagram of a software translation system 30 according to the present invention. The translation system 30 includes a translator 34 that converts a user application program 32 written to operate on a legacy system into target code 38 operable on the target platform. The primary purpose for a translator 34, is as an emulator, although it could be any translating program such as a static translator or a compiler. An emulator translates the user application software dynamically into target code 38 to allow for execution of the user application on the target operating system 44 and hardware. A static translator translates the entire user application into target code 38, which is a new executable application operable on the target platform. A compiler translates source code written in a high order software language, such as C or pascal, into target code 38, which is an executable application operable on the target platform.

The new translator 34, according to the present invention, generates both optimized target code 40 and recovery blocks 42. The new exception delivery system described in FIG. 5, allows the optimized target code 40 to be fully optimized. All optimizations possible in traditional optimization for branching are now legal for the trapping of exceptions. The recovery blocks 42 contains code instructions that when executed restore the target machine state to match the legacy machine state. The recovery blocks 42 can be generated at the same time as the optimized target code 40 for a non-dynamic translation, or can be generated on an "as needed" basis in a dynamic translation. In a non dynamic system, the translator produces many recovery blocks, up to one for every potential synchronous exception in the optimized target code 40.

When the optimized target code 40 executes on the target operating system 44, a synchronous exception may result. If an exception occurs, the target operating system 44 invokes a runtime recovery procedure 46, linked to the application as part of the runtime library. The runtime recovery procedure then restores the target machine state using the recovery blocks 42. The interaction between the target operating system 44, the runtime recovery procedure 46 and the application comprising the target code 38 is shown in FIG. 5.

Figure 5:
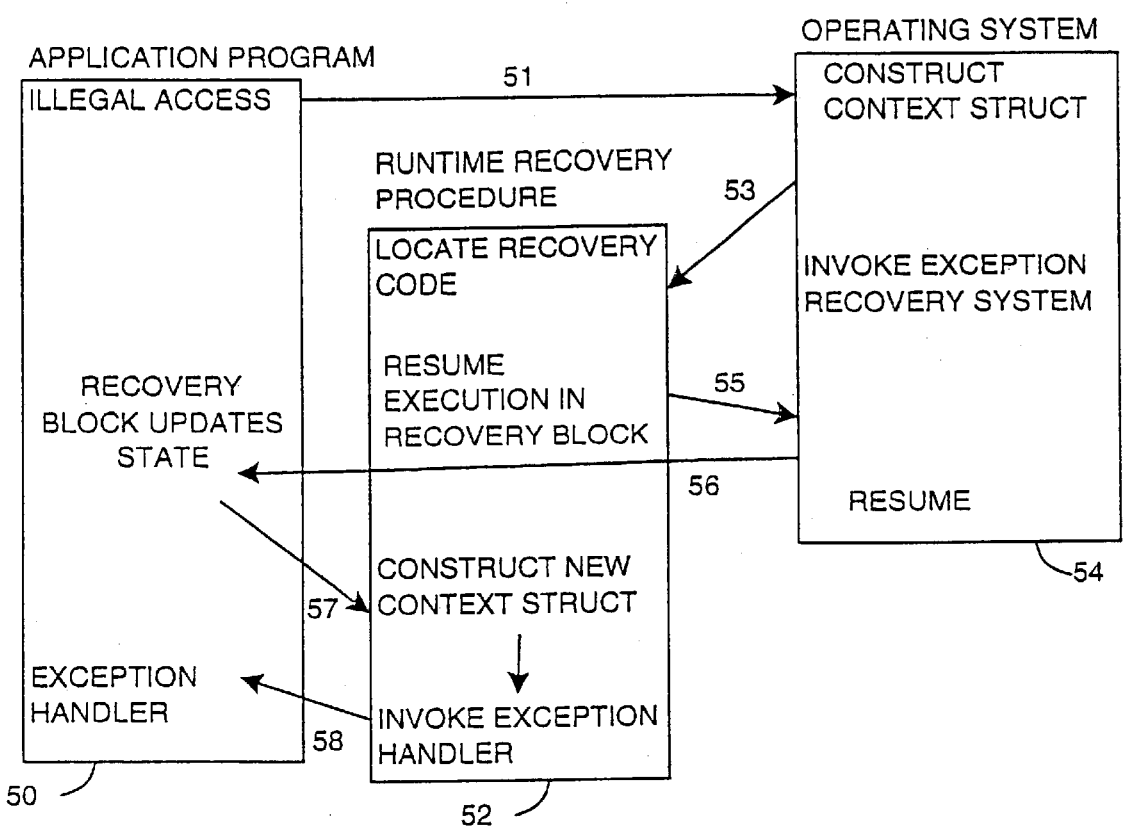
FIG. 5 is a flow diagram of a software exception delivery mechanism according to the present invention.

FIG. 5 is a flow diagram of a software exception delivery mechanism according to the present invention. When the application executes an instruction, as indicated by the line 51, it may cause a synchronous exception, such as referencing an invalid memory location. When this happens several steps occur.

First, the hardware detects the exception. The hardware records certain information about the register state of the processor into shadow registers and passes control to the operating system 54. Next, the operating system 54 creates a "context structure" that records the machine state saved by the hardware when the exception occurs. In prior art, an operating system 54 invokes the exception handler of the application code when an exception is detected, The method of the current invention instead registers the runtime recovery procedure 52 as the exception handler. As a result, the operating system 54 invokes a runtime recovery procedure 52, indicated by line 53, that is responsible for calling the application program's 50 exception handling routine with a machine state that is consistent with the legacy machine state. The runtime recovery procedure 52 does so by using the context structure passed by the operating system 54 to locate the recovery block created to restore the machine state so as to be consistent with the legacy machine state.

The recovery block may already exist in memory or, for a dynamic translation system may be subsequently generated by a new translation. Discussion of the generation of the recovery block is described above in the description of FIG. 4. The runtime recovery procedure 52 also modifies the context structure to have the execution of the software resume in the recovery block. Accordingly, upon returning control to the operating system 54, indicated by line 55, the operating system invokes 56 the recovery block in the application program 50. The recovery block code executes, making the machine state consistent with the legacy machine state. The recovery block transfers control to the runtime recovery procedure 52, indicated by line 57. The runtime recovery procedure 52 records the machine state in the context structure and passes the machine state to the application program's exception handler, indicated by line 58.

Figure 6:
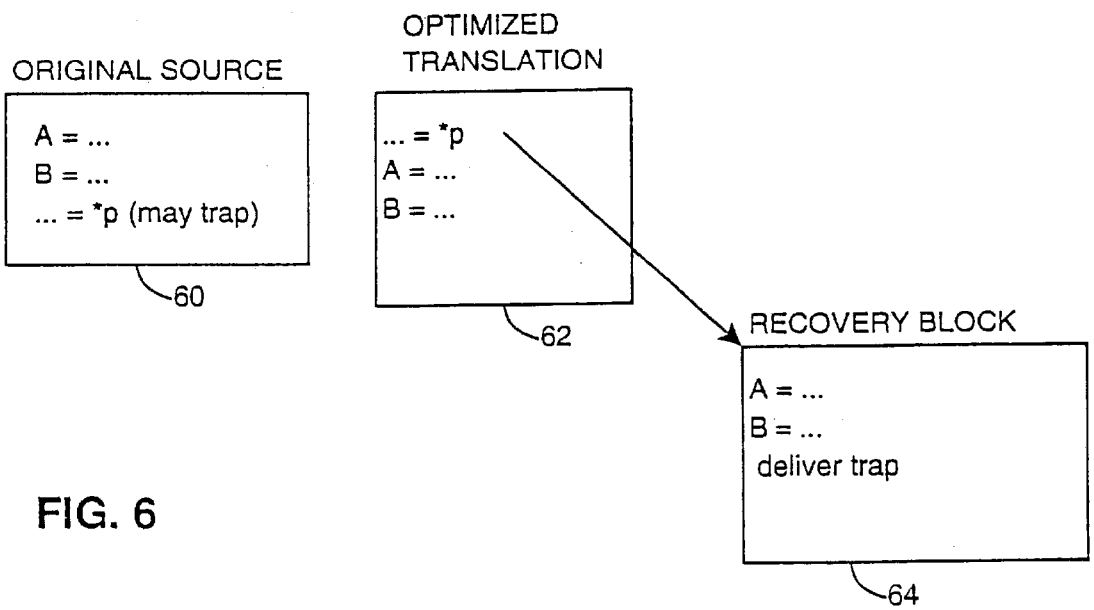
FIG. 6 is an example set of legacy and target code sections as well as an example recovery block generated from the code sections by the translation system according to the present invention.

FIG. 6 is an example set of legacy and target code sections as well as an example recovery block generated from the code sections by the translation system according to the present invention. FIG. 6 illustrates the purpose of the exception delivery mechanism, described in FIG. 5. An original source code segment 60, includes two assignment instructions to local variables, followed by an instruction that comprises a pointer dereference. The pointer dereference is an example of an instruction that may cause a synchronous exception, or "trap". An optimizing translator may find it preferable to re-order the sequence of instructions by placing the assignment statements after the pointer dereference. If an exception occurred during the pointer dereference then the states of local variables A and B are not accurate at the time of the exception. In other words, the present machine state does not accurately reflect the legacy machine state. This inaccuracy is a problem if graceful recovery from the exception needs accurate knowledge of A or B, or if the user wishes to examine the variables A or B to determine the cause of the exception.

The present invention allows for a system where any potentially trapping instruction, such as a pointer dereference, is treated as a load with a potential branch. The translator can produce an optimized translation 62, where in this example, the pointer dereference is to be executed before the assignment statements. Using a technique known in traditional branch optimizations, the recovery code can be placed in a recovery block 64. The recovery block 64 contains the assignment instructions needed to modify the state of the machine should the pointer dereference cause an exception. Every instruction that can cause a synchronous is exception, which includes any load instruction, has a conditional branch. If a synchronous exception does not occur the remainder of the optimized translation code 62 can be executed. Otherwise the recovery block 64 is executed to update the target machine state to its desired state. The recovery block instructions 64 is executed by the runtime recovery procedure described in FIG. 5.

Figure 7:
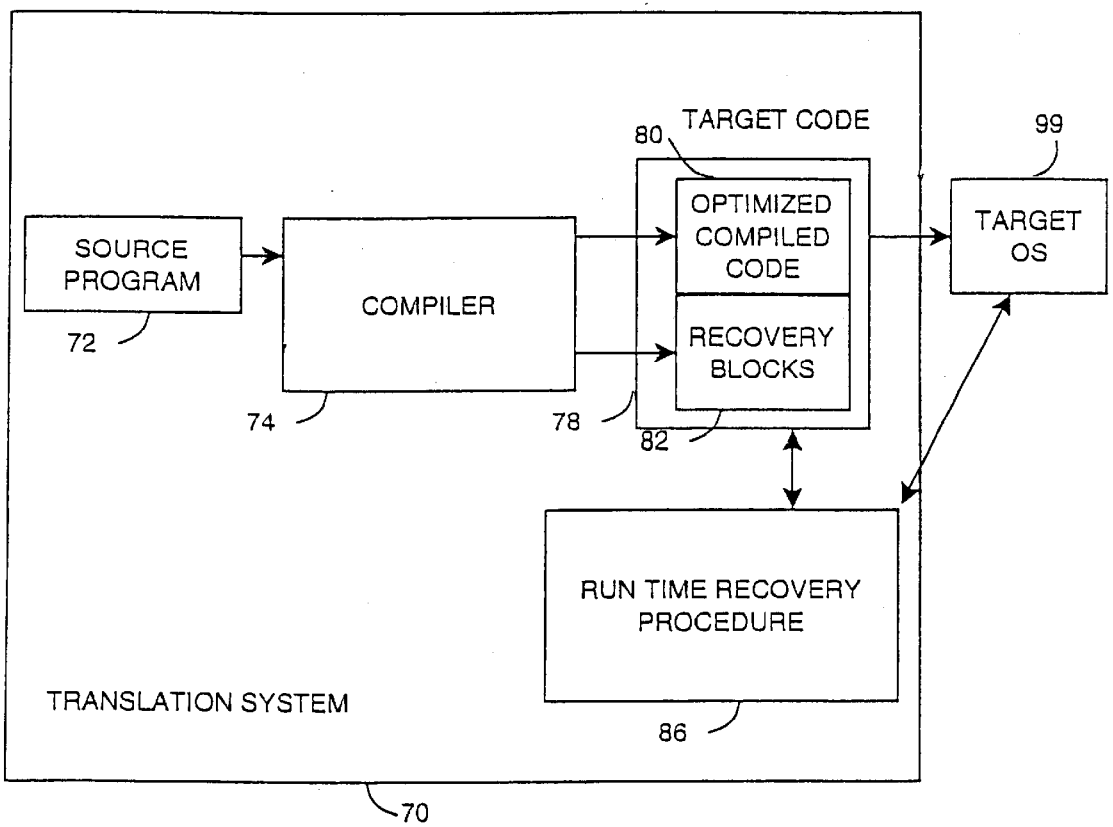
FIG. 7 is a simplified block diagram of a compiler embodiment of the translation system according to the present invention.

FIG. 7 is a simplified block diagram of a compiler embodiment of the translation system according to the present invention. This is another embodiment of the translation system described in FIG. 4. A compiler can be thought of as a translator, translating a source program into compiled code. Compilers can aggressively optimize to produce the most efficient code possible. But by doing so, they run into the same problems as an emulator of not being able to maintain an accurate state of the machine necessary at the time a synchronous exception.

The compilation system 70 includes a compiler 74 that converts a source program 72 written in a high order language such a C, into compiled code 78 operable on the target platform comprising the target hardware and the target operating system 84. The compiler 74 creates compiled code 78, including the optimized compiled code 80 as well as recovery blocks 82. The compiler produces a set of recovery blocks 82, up to one for each potentially trapping instruction in the optimized compiled code 80.

When the optimized compiled code 80 executes on the target operating system 84, a synchronous exception may result. If a synchronous exception occurs, the target operating system 84 invokes a runtime recovery procedure 86, linked to the application as part of the runtime library. The runtime recovery procedure then restores the target machine state using the recovery blocks 82.

Having described and illustrated the principles of the invention in a preferred embodiment thereof, it should be apparent that the invention can be modified in arrangement and detail without departing from such principles. I claim all modifications and variations coming within the spirit and scope of the following claims.

What is claimed is:

1. A computer implemented method for processing an exception signal caused by a target program executing on a target platform, where the target program was translated from a user application program originally constructed for execution on a legacy platform, the translated target program including an instruction sequence that has been re-ordered for optimization, the target program including an exception handling routine, the method comprising the steps of:

intercepting an exception caused by the target program;
   modifying the target machine state so as to reflect the legacy machine state, thereby placing the target machine state as it would have been had the translated target program not included a re-ordered instruction sequence; and
   transferring control to the exception handling routine of the target program.

2. A method according to claim 1, wherein:
   the method further includes the step of providing a recovery block of instructions operable on the target platform; and
   the step of modifying the target machine state includes executing the recovery block of instructions on the target platform.

3. A method according to claim 1, wherein:
   the method further includes the step of providing a plurality of recovery blocks of instructions on the target platform, each recovery block associated with an instruction in the target program where a possible exception may occur; and
   the step of modifying the target machine state includes the steps of:
      locating the recovery block associated with the exception intercepted in the intercepting step; and
      executing the located recovery block to modify the target machine state.

4. A method according to claim 1, wherein the step of intercepting an exception generated by the target program comprises the steps of:
   detecting the exception;
   constructing a context structure comprising a machine state, the context structure machine state set to the target machine state when the exception was detected; and
   invoking a recovery procedure to perform the modifying step and the transferring step.

5. A method according to claim 4, wherein the step of modifying the target machine state comprises the steps of:
   selecting a recovery block responsive to the context structure, the recovery block comprising a set of instructions for modifying the target machine state; and
   executing the selected recovery block to modify the target machine state so as to reflect the legacy machine state.

6. A method according to claim 5, wherein the step of transferring control to the exception handling routine of the target program comprises the steps of:
   modifying the context structure constructed in the intercepting step to reflect the target machine state; and
   invoking the exception handling routine of the target program.

7. A digital computer having a memory and including:
   a target machine state stored in memory;
   a user application program stored in the memory and comprising a predetermined series of instructions, the user application program having been constructed for execution on a predetermined legacy platform, the legacy platform including a legacy machine state;
   a target program stored in the memory for executing the user application program instructions by translating the user application program instructions so as to form corresponding new instructions executable on the said digital computer, the corresponding new instructions including an instruction sequence re-ordered for optimization; and
   a recovery procedure stored in the memory that is called when an exception is detected by the digital computer when executing the corresponding new instructions, the recovery procedure operable to modify the target machine state of the digital computer to match the legacy machine state as it would have been had the corresponding new instructions not included a re-ordered instruction sequence.

8. A digital computer according to claim 7, further including:
- a run-time system stored in memory, linked with the target program so as to be accessible upon execution of the target program, the run-time system comprising the recovery procedure.

9. A digital computer according to claim 7 further including:
- a recovery block of instructions, stored in memory;
- the recovery procedure operable to modify the target machine state by execution of the recovery block.

10. A digital computer according to claim 7 further including:
- a plurality of recovery blocks of instructions, stored in memory, each recovery block associated with one of the new instructions in the target program that may potentially generate an exception;
- the recovery procedure operable to modify the target machine state by execution of the recovery block associated with the detected exception.

11. A software implemented exception delivery mechanism, residing in a digital computer having a memory, the exception delivery mechanism including:
- a target machine state stored in memory;
- an application program stored in memory and including an exception handling routine and an instruction sequence re-ordered for optimization;
- an operating system stored in memory, operable to execute the application program on a target platform and further operable to detect an exception;
- a recovery procedure stored in memory, constructed and arranged to invoke the exception handling routine of the application program after modifying the target machine state, thereby placing the target machine state as it would have been had the application program not included a re-ordered instruction sequence;
- the operating system further operable to invoke the recovery procedure upon detection of the exception.

12. An exception delivery mechanism according to claim 11, wherein:
- the application program further includes a recovery block of instructions; and
- the recovery procedure is constructed and arranged to invoke the application program to execute the recovery block of instructions, thereby modifying the target machine state.

13. An exception delivery mechanism according to claim 11, wherein:
- the application code further includes a plurality of recovery blocks of instructions; and
- the recovery procedure is constructed and arranged to locate the recovery block of instructions responsive to the detected exception and invoke the application program to execute the located recovery block, thereby modifying the target machine state.

14. A computer implemented method of translating a user application constructed for use on a legacy platform to a target program operable on a target platform, the target platform having a target machine state, the legacy platform having a legacy machine state, the method to preserve synchronous exception handling, the translation method comprising the steps of:
- identifying types of instructions that can potentially cause synchronous exceptions during execution of a user application;
- generating an output instruction, thereby re-ordering an instruction sequence in the translated user application; and
- if the output instruction is one of the identified types of instructions, constructing a recovery block of code for modifying the target machine state to a corresponding legacy machine state for the instruction sequence as if it had not been re-ordered; and
- associating the recovery block with the said output instruction.

15. A method according to claim 14, further comprising repeating the steps of generating an output instruction and constructing a recovery block until completion of the translation.

16. The method according to claim 14 wherein the user application comprises a series of source code instructions and the step of generating an output instruction is done by compiling the source code instructions.

* * * * *